United States Patent
Ngan

(10) Patent No.: US 7,551,920 B1
(45) Date of Patent: Jun. 23, 2009

(54) SIGNAL STRENGTH-BASED CALL FORWARDING FOR WIRELESS PHONES

(75) Inventor: John C. W. Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 484 days.

(21) Appl. No.: 10/666,373

(22) Filed: Sep. 18, 2003

(51) Int. Cl.
*H04M 3/42* (2006.01)

(52) U.S. Cl. ................... 455/417; 455/436; 455/445

(58) Field of Classification Search ............ 455/445, 455/417, 436; 379/211.02, 211.01
See application file for complete search history.

(56) References Cited

U.S. PATENT DOCUMENTS

| | | | |
|---|---|---|---|
| 5,594,943 A * | 1/1997 | Balachandran | 455/436 |
| 5,673,308 A | 9/1997 | Akhavan | 379/61 |
| 5,946,616 A | 8/1999 | Schornack et al. | 455/422 |
| 5,953,657 A | 9/1999 | Ghisler | 455/417 |
| RE37,301 E * | 7/2001 | Lo | 370/448 |
| 6,496,700 B1 * | 12/2002 | Chawla et al. | 455/435.2 |
| 6,512,817 B1 | 1/2003 | Dale et al. | 379/9.05 |
| 6,567,665 B1 * | 5/2003 | Kissee | 455/436 |
| 6,584,316 B1 * | 6/2003 | Akhteruzzaman et al. | 455/445 |
| 6,587,683 B1 | 7/2003 | Chow et al. | 455/417 |
| 6,708,028 B1 * | 3/2004 | Byrne | 455/426.1 |
| 6,782,262 B1 * | 8/2004 | Lundborg | 455/449 |
| 6,876,949 B2 * | 4/2005 | Hilliard et al. | 702/182 |
| 7,171,221 B1 * | 1/2007 | Amin et al. | 455/462 |
| 2002/0022480 A1 * | 2/2002 | Jensen | 455/423 |
| 2002/0137498 A1 * | 9/2002 | Goss et al. | 455/417 |
| 2003/0003900 A1 * | 1/2003 | Goss et al. | 455/417 |
| 2004/0152429 A1 * | 8/2004 | Haub et al. | 455/102 |
| 2004/0204183 A1 * | 10/2004 | Lencevicius et al. | 455/574 |

FOREIGN PATENT DOCUMENTS

| | | |
|---|---|---|
| WO | WO 0205378 | 7/2002 |
| WO | WO 02058378 | 7/2002 |

OTHER PUBLICATIONS

Zoran Salcic, "AGPS-An Automatic GSM-based Positioning and Communication System", Proceedings of GeoComputation, 1997 & SIRC 1997, pp. 15-22.*
Pending U.S. Patent Application for Durga Prasad Satapathy, "Proactive Management of Dropped Calls in a Wireless Communication System", U.S. Appl. No. 10/101,106, filed Mar. 19, 2002.

* cited by examiner

*Primary Examiner*—George Eng
*Assistant Examiner*—Muthuswamy G Manoharan

(57) ABSTRACT

A mobile station monitors received signal strength from a base transceiver station, either directly or by monitoring or some other measure of received signal quality, such as the ratio $E_c/I_o$ in a CDMA network. When the signal strength drops below a threshold, the mobile station is programmed to automatically send a feature code to the wireless network to activate unconditional call forwarding to a previously programmed directory number. When the mobile station re-enters the service network, i.e., the signal strength improves to an acceptable level or goes above the threshold, the mobile station automatically sends a feature code to turn off the unconditional call forwarding. Thereafter, incoming phone calls are directed to the mobile station.

11 Claims, 3 Drawing Sheets

SIGNAL STRENGTH-BASED CALL FORWARDING FOR WIRELESS PHONES

BACKGROUND

1. Field of the Invention

This invention relates generally to generally to wireless telephony and in particular to a call forwarding feature for wireless telephones that is triggered when the received signal strength at the wireless telephone falls below a threshold level, indicating that the wireless telephone is moving out of service coverage.

2. Description of Related Art

Cellular wireless, like other forms of wireless communication, is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites, each defined by a radio frequency ("RF") radiation pattern from a respective base transceiver station ("BTS") antenna. Each BTS antenna in a cell is in turn coupled with a base station controller ("BSC"), cooperatively defining a base station system. The BSC is then coupled to or functionally integrated within a switch (e.g., a mobile switching center ("MSC")) and/or gateway (e.g., a packet data serving node ("PDSN")) that provides connectivity with a transport network such as the PSTN (public switched telephone network) or a public or private Internet Protocol network (e.g., the Internet). This combination of network elements is referred to herein as a "serving system."

When a mobile station, such as a cellular telephone, pager, or appropriately equipped portable computer, for instance, is positioned in a cell, the mobile station communicates via an RF air interface with the BTS antenna of the cell. Consequently, a communication can be established between the mobile station and another entity on the transport network, via the air interface, the BTS, the BSC and the switch or gateway. Such a communication may be referred to as a "call," whether the communication is a traditional voice "call" or a more advanced data session.

A typical telecommunication system service provider (e.g., Sprint or Verizon) may operate a central controller, such as a service control point (SCP), that assists in call processing. Applying well-known "intelligent network" principles, for instance, a serving system may automatically signal to the central controller when a request is made to connect a call to or from a subscriber via the serving system. The central controller may then apply service logic and send a response to the serving system, instructing the serving system how to handle the call or simply ending the transaction.

A service provider typically maintains an account for each subscriber that it serves, in order to define service authorizations for the subscriber and to facilitate billing. Usually, each subscriber account will have a corresponding service profile that indicates the scope of service to be provided, and the service provider will refer to the profile when serving the subscriber, in order to determine what services to provide or not to provide.

In a telephone system, for instance, a subscriber's profile may indicate how the service provider should handle or respond to attempts to connect telephone calls to or from a given subscriber. For example, the subscriber's profile may indicate that the subscriber is not allowed to place calls to certain area codes, and so the service provider may block any attempt by the subscriber to place calls to those area codes. As another example, the subscriber's profile may indicate that some or all calls to the subscriber should be forwarded to another number or to voice mail under certain conditions, and so the service provider may accordingly forward an incoming call under those conditions.

Typically, each subscriber account will have a corresponding account number or other account identifier, and the account profile will be keyed to that number or other identifier. For example, in a landline telephone system, each customer's account has a directory number that is assigned to the telephone line extending to the customer's premises. A telephone company may then maintain a service profile for each account, keyed to the assigned directory number. When the telephone company processes calls to or from a given directory number, the company may then refer to the service profile that is keyed to that directory number.

As another example, in a mobile telephone system, each mobile phone typically has an assigned identifier (e.g., a mobile directory number (MDN), a mobile identification number (MIN) or mobile station identifier (MSID)). A wireless carrier may then maintain a service profile for each mobile phone, keyed to the assigned identifier. And when the wireless carrier processes calls to or from a given mobile phone, the carrier may then refer to the service profile that is keyed to the mobile phone's identifier.

A service provider can maintain its subscribers' service profiles in various locations. For example, the service provider could maintain the profiles within the serving systems that serve the subscribers, such as in a local switching office for instance. The service profile for a landline subscriber could regularly reside in the serving system that provides the telephone line for the subscriber. The service profile for a mobile subscriber could be downloaded to the serving system from a home location register (HLR) when the mobile subscriber is operating in the serving system. When the serving system receives a request to set up a call to or from a given subscriber, the serving system may then refer to the profile for that subscriber to determine how to process the request.

Additionally or alternatively, a service provider can maintain its subscribers' service profiles in a central controller, such as an SCP for instance. When a serving system receives a request to set up a call to or from a subscriber that it serves, the serving system may encounter an intelligent network trigger and responsively signal to the central controller. The central controller may then refer to the profile for that subscriber to determine how to proceed and may then instruct the serving system accordingly.

Certain services defined by a subscriber's service profile may be configurable. For example, a subscriber's profile may define a call-forwarding service as described above, and the subscriber may be allowed to set the forward-to number and to turn call-forwarding on or off at will. As another example, a subscriber profile may define a voice mail service, and the subscriber may be allowed to turn the service on or off.

To allow subscribers to configure services in their service profiles, the industry has for many years employed a concept known as "feature codes." A service provider may define specific digit sequences for use in activating, deactivating or modifying particular service features. Each sequence is known as a feature code (or, equivalently, a feature code string). A feature code usually consists of a preceding asterisk (*) or double asterisk (**) followed by a series of numeric digits (0 through 9), but could take other forms as well.

Further, a pound sign (#) is sometimes used to delimit particular sequences of digits. For instance, the feature code string

*72 4085550303# could mean that a call forwarding forward-to number is being registered. In this example, *72 may indicate that the call-forwarding feature is being accessed, and the digit sequence 4085550303 may indicate the forward-to number.

When a subscriber sends a feature code to a serving system, the serving system may respond to the feature code by employing logic to change (i.e., activate, deactivate or modify) a service feature in a local copy of the subscriber's profile. Alternatively or additionally, the serving system may forward the dialed digits to a central controller, and the central controller may then respond to the feature code by activating, deactivating or modifying a service feature in the subscriber's profile and then sending a response message to the serving system.

Communications between the mobile station and the BTS will typically suffer from varying levels of interference and signal degradation, due to factors such as (i) the number and power level of mobile stations concurrently communicating over the air interface, (ii) obstructions such as buildings, land or foliage, and (iii) the distance between the mobile station and the BTS. Consequently, the strength of RF signals that the mobile station receives from the BTS can vary. Furthermore, the strength of RF signals that the BTS receives from the mobile station can vary.

When a mobile station is actively engaged in a call, if the RF signal strength received by the mobile station and/or BTS becomes too low, the RF link will be effectively cut off, which will thereby disconnect or "drop" the call.

U.S. Pat. No. 6,587,683 describes various feature codes for activating features like call forwarding, call screening, etc. However, the '683 patent does not contemplate initiating of call forwarding when the received signal strength drops below a threshold level or turning off call forwarding when the mobile station re-enters the service network.

U.S. Pat. No. 6,584,316 describes an automatic call-forwarding feature based on the GPS location of the wireless telephone. In particular, if there is a weak signal and the user has previously indicated that call forwarding should occur if the signal strength becomes weak, the method obtains a current GPS location of the mobile station. A computer program then proceeds to look up a land line telephone directory number stored in the mobile station's memory associated with the mobile station's GPS location. If there is no directory number for the current location, the process is complete and no call forwarding is accomplished. Only if there is a directory number for the GPS location of the mobile station will call forwarding proceed. This method thus requires manual entry of specific call forwarding numbers for particular locations where signal strength is weak. Obviously, this approach has limited usefulness, since it is dependent on a land line telephone being present nearby, and furthermore requires significant operator input to provide the list of landline telephone numbers at various locations.

The present invention provides an improvement to the above referenced patents and provides for automated initiation of call forwarding when signal strength is weak, without regards to the current location of the mobile station, or whether there is a landline telephone with a previously known directory number nearby.

SUMMARY OF THE INVENTION

In a principal aspect, this invention provides for a method of call forwarding in which the mobile station monitors the received signal strength, either directly or by monitoring some other measure of received signal quality, such as the ratio $E_c/I_o$ in a CDMA network. When the signal strength drops below a threshold, the mobile station is programmed to automatically send a feature code to the wireless network to activate unconditional call forwarding to a previously programmed directory number. Thereafter, calls that would be directed to the mobile station are sent to the call forwarding number. As an example, the call forwarding number could be a home telephone number, an office telephone number, an answering service, or whatever number the user may wish to use for call forwarding. Meanwhile, the mobile station continues to monitor signal strength (or any equivalent or suitable measure of signal quality). Then, when the mobile station re-enters the service network, i.e., the signal strength improves to an acceptable level or goes above the threshold, the mobile station automatically sends a feature code to turn off the unconditional call forwarding. Thereafter, incoming phone calls are directed to the mobile station.

BRIEF DESCRIPTION OF THE DRAWING

An exemplary embodiment of the present invention is described herein with reference to the drawings, in which.

DETAILED DESCRIPTION OF AN EXEMPLARY EMBODIMENT

In a principal aspect, this invention provides for a method of call forwarding in which a mobile station includes circuitry and/or software that monitors the received signal strength at the mobile station. The monitoring could be directly (i.e., monitoring a dB level of the pilot signal from a base transceiver station antenna, or signal to noise ratio), or by monitoring or some other measure of received signal quality such as the ratio $E_c/I_o$ in a CDMA network. When the signal strength (or equivalently, signal quality) drops below a threshold of say −85 dB to −90 dB, the mobile station is programmed to automatically send a feature code to the wireless network to activate unconditional call forwarding to a previously programmed directory number. Later, when the mobile station moves back into the coverage zone in the wireless network and the signal strength or signal quality improves above the threshold, a feature code is automatically sent to the network to turn off call forwarding.

Before describing the preferred embodiment in greater detail, background information describing an environment in which the invention will be set forth initially.

A. Exemplary Communication System

Figure 1:
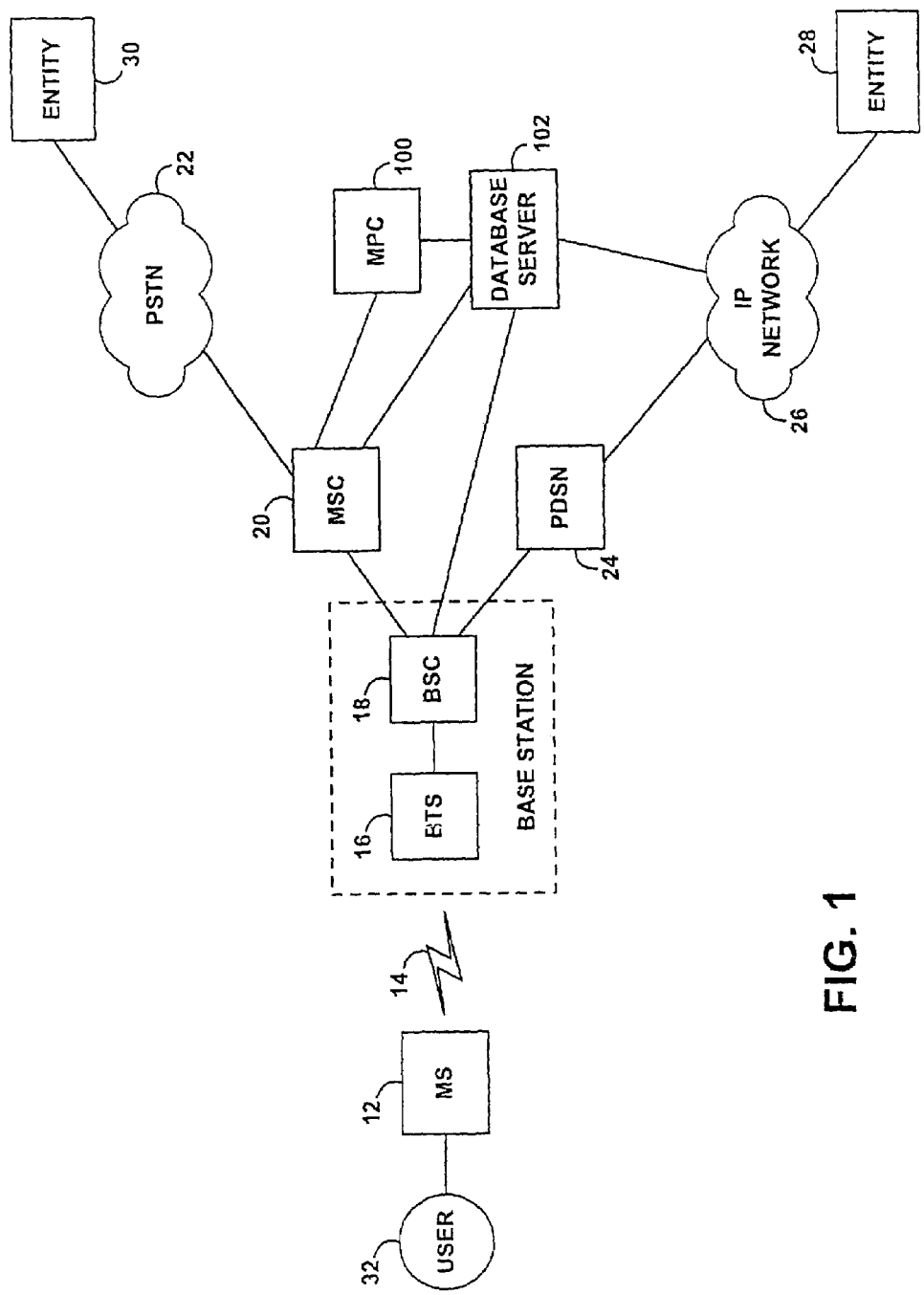
FIG. 1 is a block diagram of a communication system in which the exemplary embodiment can be implemented.

Referring to the drawings, FIG. 1 is a block diagram of a communication system in which an exemplary embodiment of the present invention can be implemented. Note that this and other arrangements described herein are illustrative only, and other arrangements and other elements (e.g., machines, interfaces, functions, orders of functions, etc.) can be used instead and some elements may be omitted altogether. In this regard, it should be understood that various entities shown in the figures are functional in nature and, as such, may be physically embodied in a variety of forms and may be embodied in or implemented as discrete components or in conjunction with other components (whether or not shown), in any suitable combination and location.

In the exemplary system shown in FIG. 1, a mobile station (MS) 12 communicates via an RF air interface 14 with a BTS 16, which is then coupled with a BSC 18. As noted above, the BSC may then be coupled or integrated with a switch or gateway that provides connectivity with a transport network. For example, as shown, BSC 18 may be coupled with an MSC 20, which provides connectivity with PSTN 22. (In this regard, the BSC function can be integrated into the MSC, thereby eliminating the BSC as a discrete network element.) And as another example, BSC 18 may be coupled with a PDSN 24, which provides connectivity with an IP network 26 such as the Internet.

Through this arrangement, MS 12 can engage in a call with an entity on a transport network. For example, if suitably equipped, MS 12 may engage in a data session with an entity 28 on IP network 26. And as another example, if suitably equipped, MS 12 may engage in a voice call with an entity 30 on PSTN 22. Of course, MS 12 might also or instead engage in other types of calls with other types of entities, through various communication paths.

When MS 12 is actively engaged in a call with another entity on a transport network, a user 32 of MS 12 may be able to interact with that other entity. For example, if the other entity is a telephone, the user may be able to engage in a call with another person (call-participant) operating that telephone. And as another example, if the other entity is a web server, the user may be able to engage in a data session with that web server, such as by operating a web browser on the mobile station 12. Additional examples are possible as well.

The exemplary system of FIG. 1 may also include a mobile-positioning system, which can function to determine the location of mobile stations. As shown in FIG. 1, for instance, a mobile positioning center (MPC) 100 can be linked with MSC 20 via a signaling network. According to well known industry standards (e.g., J-STD-036), the MPC 100 may be an application running on a service control point (SCP) platform and functions as a location server, able to maintain records of mobile station location and to report location information to querying entities. The MPC may determine the location of a mobile station through interaction with position determining equipment (not shown), which may be network-based (e.g., triangularization mechanisms) or handset-based (e.g., GPS-determined location reported from a mobile station). In the arrangement shown, MPC may also be coupled with a database server 102 (which could instead be generalized as a database function, whether discrete or integrated as part of the MPC or some other entity). Database server 102 may function to extract location information from MPC 100. Further, as shown, database server 102 may be coupled with MSC 20 so as to be able to obtain call drop information (e.g., records of call drop events) from MSC 20. And database server 102 may be coupled with BSC 18 so as to be able to interact with BSC 18, and with IP network 26 so as to be able to interact with other entities via IP network 26. Other arrangements are possible as well. In the preferred embodiments, the geographic location of the mobile station is not necessary to initiate call forwarding and therefore location reporting feature is optional or can be omitted entirely.

Figure 2:
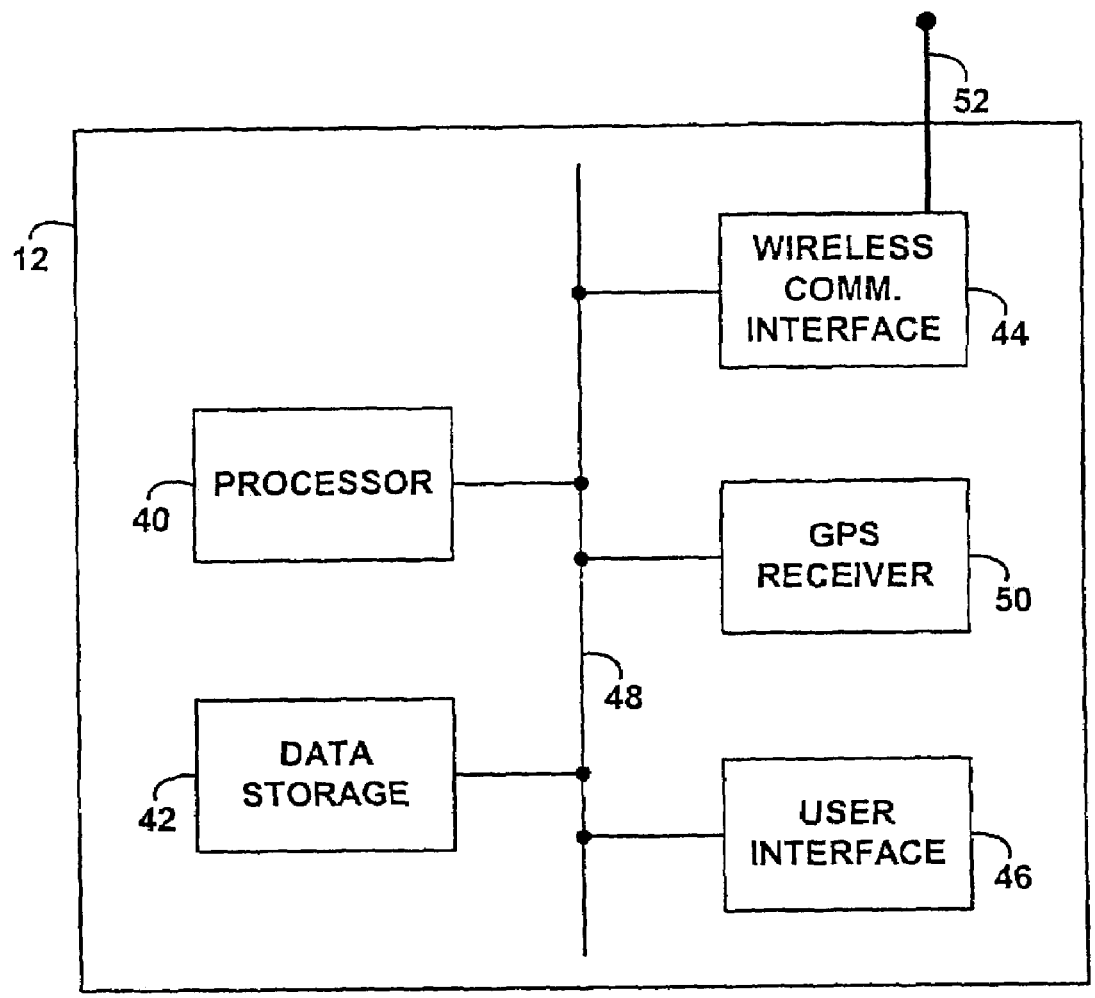
FIG. 2 is a block diagram of an exemplary mobile station as depicted in FIG. 1.

Referring next to FIG. 2, a simplified block diagram of an exemplary MS 12 is shown. As illustrated, MS 12 may include a processor 40, data storage 42, a wireless communication interface 44 and a user interface 46, all coupled together by a system bus 48. In addition, MS 12 may include an optional global positioning system (GPS) receiver 50, to facilitate determining its location. The mobile station further includes signal strength or signal quality monitoring circuitry, the details of which are not particularly important and can vary widely depending on the technology used in the wireless network.

In the exemplary embodiment, data storage 42 may hold a set of machine language instructions, which are executable by processor 40 to carry out various function described herein, including instructions to automatically send feature codes to turn on and turn off call forwarding depending on the received signal strength. (Note that, alternatively, some of those functions could instead be implemented through hardware.) In addition, data storage 42 may hold various data to facilitate carrying out various functions. For example, data storage 42 may hold speech signals, and data storage 42 may hold threshold data and user interface data.

Wireless communication interface 44 in turn functions to facilitate communication over air interface 14. Thus wireless communication interface 44 may include a suitable antenna 52 and transceiver circuitry (not shown). And user interface 46 functions to facilitate interaction with a user of the mobile station. As such, user interface 46 may include input mechanisms (e.g., a microphone, video camera and/or keypad) and output mechanisms (e.g., audio speaker and/or video display) (not shown).

Figure 3:
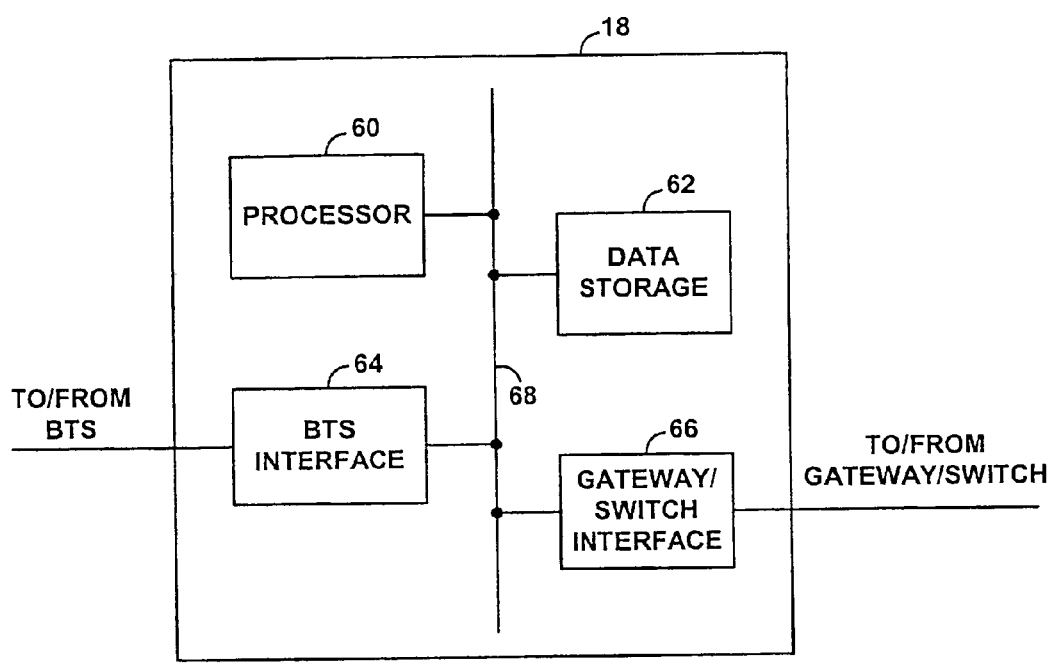
FIG. 3 is a block diagram of an exemplary base station as depicted in FIG. 1.

Referring next to FIG. 3, a simplified block diagram of BSC 18 is shown as well. As illustrated, BSC 18 includes a processor 60, data storage 62, a BTS interface 64, and a gateway/switch interface 66, all interconnected by a system bus 68. In the exemplary embodiment, data storage 62 may hold machine language instructions that are executable by processor 60 to carry out various functions described herein. (Note that, alternatively, some of those functions could instead be implemented through hardware.) The data storage 62 may also hold data to facilitate carrying out various functions described. BTS interface 64 facilitates communication with BTS 16, and gateway/switch interface 66 facilitates communication with a gateway and/or switch, such as MSC 20 and/or PDSN 24.

B. Signal Strength-Based Call Forwarding

The mobile station continuously monitors its received signal strength using circuitry and software provided in the mobile station. Under IS-2000a, for instance, this monitoring may take the form of monitoring the "Pilot Strength Measurement" ("PSM"), which defines the strength of a BTS "pilot signal" as received by the MS. Alternative methods well-known in the industry may be used as well. For example, in a CDMA network, the mobile station may continuously monitor the ratio $E_c/I_o$, wherein $E_c$ is a measure of carrier strength and $I_o$ is a measure of interference. The received signal strength is compared to a threshold (referred to interchangeably as "warning level"), and if the signal strength falls below the threshold, the MS may conclude that it is now time to activate the unconditional call forwarding feature by sending a feature code to the network to turn on unconditional call forwarding to a previously programmed telephone number.

Further, any of a variety of entities can function to establish the threshold level at which call forwarding should be initiated. For instance, the BSC can establish the warning-level that it will use as a threshold for MS received signal strength and could report the warning-level to the MS. For instance, the BSC could send an indication of the warning-level to the MS in a user-definable field over an air interface paging channel. Or, the BSC could publish the warning-level to a data store accessible by the MS, and the MS can then reference the warning-level in that data store. Alternatively, the MS itself could establish the warning level to be used as a threshold for MS received signal strength.

As a particular example, the BSC could regularly determine an average call-drop level for some or all of the mobile stations that it serves and can then set the warning level (threshold) for those mobile stations to be a predefined extent above that average call-drop level. To do this, the BSC may maintain in its data storage 62 a running average of the received signal strength for dropped call events among the mobile stations that it serves. Each time a mobile station experiences a dropped call, the BSC can update the average based on the last known received signal strength for that mobile station. And the BSC may then set the warning-level to a sufficient extent above that average received signal strength.

This or other such determinations could be made per mobile station (or per type of mobile station.) In this regard, a data file that is maintained by and/or accessible to the BSC and/or MS can correlate call-drop level and/or warning-level with MS identity. For instance, a table can correlate each mobile station's Electronic Serial Number (ESN) with a particular warning-level. Or a table could indicate each mobile station's type (e.g., model name or number), and another table could indicate the warning-level and/or call-drop level per mobile station type. Further, note that the warning-level and/or call-drop level can vary depending on performance of the BSC or BTS and/or depending on other factors.

In this regard, the warning-level can be offset from the call-drop level by a fixed extent that is believed to be enough to allow for advanced warning. For instance, the warning-level can be set at a level such as 1 dB or 2 dB above the call-drop level.

Alternatively, the warning-level can be dynamically set per mobile station based on experience with past call drop events involving the mobile station and/or involving a population of mobile stations. More particularly, the warning-level can be dynamically set based on how much time has passed between the moment the received signal-strength hit the warning-level and the moment the received signal strength hit the call-drop level (or the moment of call-drop) for past call drop events involving the mobile station or involving mobile stations of a given population.

For instance, the BSC can maintain a record of warning-level per MS. And the BSC can be programmed to adjust the warning-level in an effort to approximate or approach a 30 second call-drop warning. To do so, each time the MS experiences a call-drop event, the BSC can determine how much time passed between the warning-level and the call-drop level. If that time is less 30 seconds, then the BSC may increase the warning-level so as to increase the warning time. And if the time is greater than 30 seconds, then the BSC may decrease the warning level so as to decrease the warning time. (Similarly, an MS may set its own warning level by a similar process.)

Alternatively, the BSC may determine the average time that has passed between warning-level and call-drop level for a past number of call-drop events. And, based on that average, the BSC may then adjust the warning-level in an effort to approach a desired duration between warning-level and call-drop level for subsequent call-drop events. Variations on this process are also possible.

The fact that received signal strength has fallen below a warning-level can indicate that a call drop is about to or would occur if a call were in process. On the other hand, it is also possible that a drop in received signal strength may be merely a transient aberration, and the signal strength might quickly rise again. Therefore, it is possible that a drop below the warning-level might not itself accurately reflect that call forwarding should be initiated. Thus, continuous monitoring of signal strength and initiation of call forwarding if signal strength falls below a threshold and remains there for some period of time is a preferred embodiment.

According to the exemplary embodiment, the foregoing process can be improved by considering a change in received signal strength over time, such as by comparing received signal strength to multiple threshold levels.

For instance, if the received signal strength drops substantially continuously from a first warning-level down to a second warning-level, then it may be reasonable to conclude that the MS should initiate unconditional call forwarding. On the other hand, if the decrease in received signal strength from the first warning-level to the second warning-level is not substantially continuous, then it may be more likely that the drop below the second warning-level was just a transient aberration and call forwarding should not be initiated.

Further examples of how to monitor signal strength and whether a dropped call will likely occur are set forth in copending application of Durga Satapathy, "Proactive Management of Dropped Calls in a Wireless Communication System", Ser. No. 10/101,106 filed Mar. 19, 2002, the contents of which are incorporated by reference herein.

After the mobile station sends the feature code to the network to initiate call forwarding, new incoming calls that would be directed to the mobile station are sent to the call forwarding number. For example, the call forwarding number could be a home telephone number, an office telephone number, an answering service, or whatever number the user may wish to use for call forwarding. Meanwhile, while the call forwarding is in effect, the mobile station continues to monitor signal strength (or equivalent measure of signal quality). Then, when the mobile station re-enters the service network, i.e., the signal strength improves to an acceptable level or goes above the threshold, the mobile station automatically sends a feature code to turn off the unconditional call forwarding. Thereafter, incoming phone calls are directed to the mobile station.

From the foregoing, it will be appreciated that I have described an improved wireless telephone. The wireless telephone that includes circuitry monitoring a measure of received signal strength from a wireless base station; programmable logic (described herein in functional terms) providing instructions for automatically transmitting a first feature code from the wireless telephone to a wireless network activating call forwarding when said circuitry determines that the received signal strength falls below a threshold level; and programmable logic (also described herein in functional terms) providing instructions for automatically transmitting a second feature code from the wireless telephone to the wireless network deactivating call forwarding when the circuitry determines that the received signal strength, having previously fallen below a threshold level, rises above the threshold level. Persons skilled in the art will be able to code such instructions in software and export such software to mobile telephones without undue experimentation.

Example 1

A user of a mobile station programs the mobile station such that when unconditional call forwarding is activated, calls are forwarded to the user's home land-line telephone. When the user travels with their mobile station, the mobile station continuously monitors the signal strength (or equivalent measure of signal quality such as $E_c/I_o$). When the signal strength falls below the threshold, the mobile station automatically sends the feature code *72# to the wireless network. A control point in the wireless network processes the feature code and activates unconditional call forwarding for the mobile station. During the period when unconditional call forwarding for this mobile station is active, incoming calls for the mobile station are forwarded to the home telephone number for the user. When the mobile station re-enters the service coverage of the wireless network and signal strength rises above the threshold, a new feature code (e.g., *73#) is sent, which triggers deactivation of call forwarding. Thereafter, incoming calls are directed to the mobile station.

Example 2

Same scenario as Example 1, except the user decides that for a particular occasion, when they are expecting a business-related phone call, they program automatic call forwarding on their mobile station such that calls are forwarded to an office number. When the user leaves the service area (signal strength falls below the threshold), the call forwarding feature code is sent to the wireless network and the wireless network forwards calls to the office number programmed by the user. Later on, the user manually re-programs the mobile station such that when call forwarding is activated, calls are forwarded to their home landline telephone number.

Example 3

Same scenario as Example 1, except that while call forwarding is activated (signal strength below threshold), the user turns off their phone. The monitoring of the received signal strength is interrupted during the period when the phone is off. Later, the phone is turned back on. The phone begins to monitor received signal strength. If, when the phone is turned on, the signal strength is above the threshold, the phone automatically sends a feature code to the wireless network to deactivate call forwarding. If, when the phone is turned on, the signal strength is still below the threshold, in one possible embodiment the activate call forwarding feature code is re-sent. Alternatively, the phone could include logic circuitry that stores in non-volatile memory the status of call forwarding, and, since call forwarding is currently activated (feature code *72# was sent and no transmission of feature code *73# has yet occurred), no call forwarding feature code is sent out again.

FURTHER CONSIDERATIONS

The feature code can be sent to the wireless network over an access channel, which generally requires less transmission power than a regular transmission channel. In this matter, if the received signal strength is very weak, the feature code can be transmitted safely over the access channel, whereas if the feature code was sent over a transmission channel it might not get through.

As noted above, the threshold level that triggers the sending of the call forwarding feature code could be determined by an element in the wireless network and transmitted to the mobile station. Alternatively, the level could be programmed into the mobile unit at the factory or during an initialization process. As noted above, wherein the threshold level could vary depending on the type (e.g., brand, year, model, etc.) of mobile station.

Variation from the specifics of the presently preferred embodiments set forth above can of course occur without departure from the scope of the invention. All questions concerning scope of the invention will be answered by reference to the appended claims, interpreted in light of the foregoing specification. In the claims, the term "monitored measure of received signal strength" is used, and is meant to be interpreted broadly to mean either monitoring a direct measurement of signal strength, as in dB or, monitoring any other equivalent measure of signal strength or signal quality, such signal to noise ratio, ratio of signal strength to interference strength, or other measure of signal quality, such as the measurements of base transceiver signal strength used to determine the need for a handoff from one cell to another, that would be useful for determining whether call forwarding should occur due to the mobile station moving out of service coverage.

The invention claimed is:

1. A method of activating call forwarding for a mobile station, comprising the steps of:
   monitoring a measure of received signal strength at said mobile station, the measure of received signal strength being of a signal transmitted between a base transceiver station of a cellular wireless telephone network and the mobile station;
   automatically transmitting a first feature code from said mobile station to a wireless network when said monitored measure of received signal strength falls below a threshold level, said first feature code activating call forwarding for said mobile station such that incoming calls are directed to a separate device associated with a previously programmed directory number;
   continuing to monitor signal strength of a signal transmitted between the base transceiver station and the mobile station at said mobile station during a period when call forwarding is activated; and
   automatically transmitting a second feature code from said mobile station to a wireless network when said signal strength rises above said threshold level, said second feature code deactivating said call forwarding.

2. The method of claim 1, wherein said step of monitoring a measure of received signal strength comprises the step of monitoring the ratio $E_c/I_o$, wherein $E_c$ is a measure of carrier strength and $I_o$ is a measure of interference.

3. The method of claim 1, wherein said step of monitoring a measure of received signal strength comprises the step of monitoring a signal to noise ratio of a received signal from a base transceiver station in the cellular wireless telephone network.

4. The method of claim 1, wherein said mobile station comprises a cellular telephone.

5. The method of claim 1, wherein the previously programmed directory number is changeable by a user of said mobile station by interactively entering said directory number.

6. The method of claim 1, wherein said feature code is sent to said wireless network over an access channel.

7. The method of claim 1, wherein the threshold level is determined by an element in said wireless network and transmitted to said mobile station.

8. The method of claim 1, wherein the threshold level lies in the range of −85 dB to −90 dB.

9. The method of claim 1, wherein the first feature code is transmitted if the monitored measure of received signal strength remains below the threshold level for a predetermined period of time.

10. A wireless telephone comprising:
- circuitry monitoring a measure of received signal strength from a base transceiver station of a cellular wireless telephone network;
- programmable logic providing instructions for automatically transmitting a first feature code from said wireless telephone to a wireless network activating call forwarding when said circuitry determines that the received signal strength of a signal transmitted between the base transceiver station and the mobile station falls below a threshold level; and
- programmable logic providing instructions for automatically continuing to monitor the received signal strength from a base transceiver station of a cellular wireless telephone network after the first feature code is transmitted and for transmitting a second feature code from said wireless telephone to a wireless network deactivating call forwarding when said circuitry determines that the received signal strength, having previously fallen below a threshold level, rises above said threshold level.

11. The wireless telephone of claim 10, wherein said wireless telephone operates in a CDMA network and wherein said circuitry monitors the ratio $E_c/I_o$, wherein $E_c$ is a measure of carrier strength and $I_o$ is a measure of interference.

\* \* \* \* \*